United States Patent Office

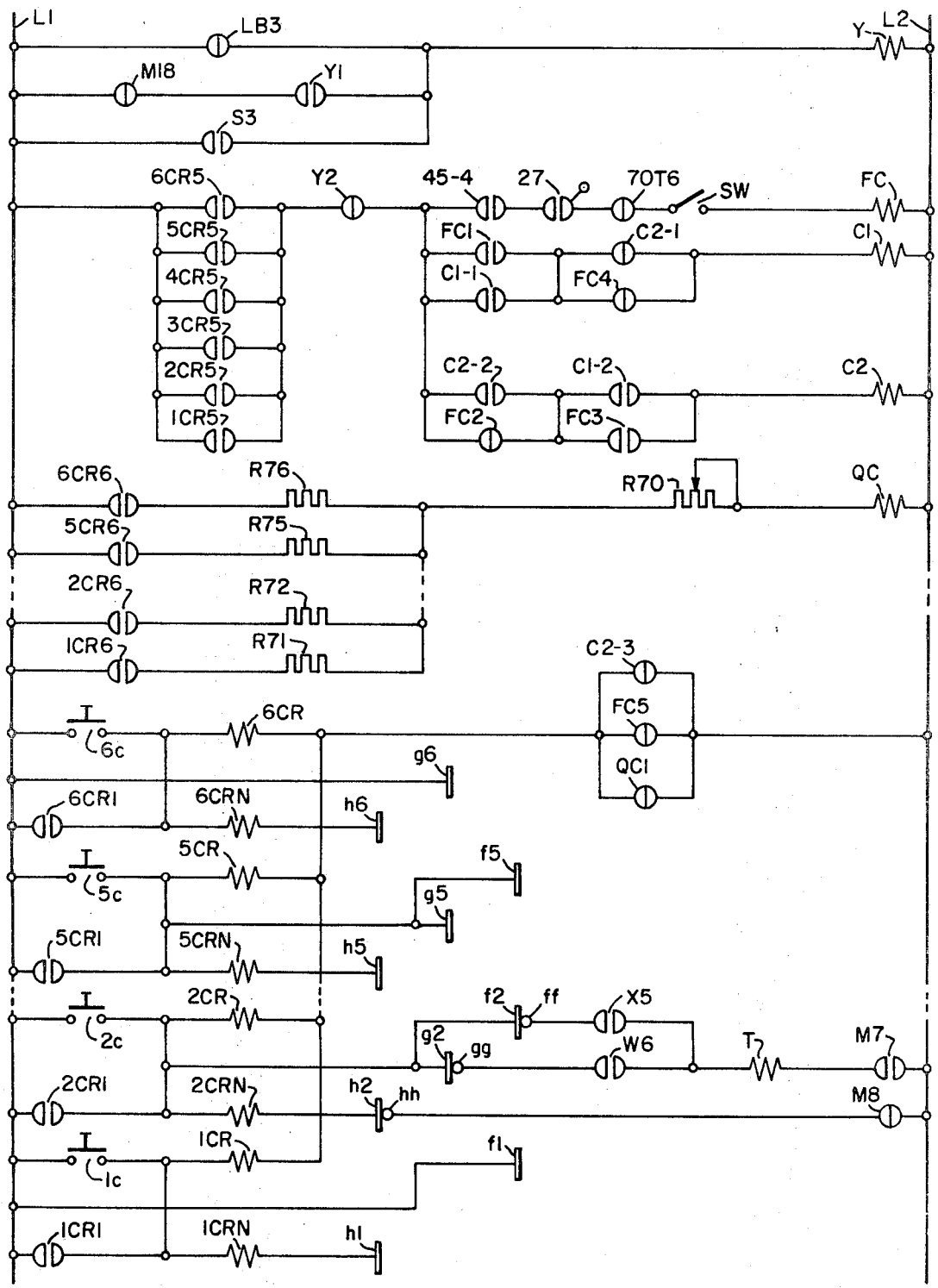

3,519,102
Patented July 7, 1970

---

3,519,102
AUTOMATIC CANCELLATION OF FALSE CALLS
Henry C. Savino, Hackensack, N.J., assignor to Westinghouse Electric Corporation, Pittsburgh, Pa., a corporation of Pennsylvania
Filed June 26, 1968, Ser. No. 740,217
Int. Cl. B66b 1/20
U.S. Cl. 187—29   7 Claims

ABSTRACT OF THE DISCLOSURE

In an elevator supervisory system, all car calls in a particular car are cancelled if that car makes a predetermined number of successive stops for car calls during which no one leaves the car. Optionally, the remaining car calls are cancelled only if they comprise a predetermined quota of calls.

BACKGROUND OF THE INVENTION

Field of the invention

This invention relates to vehicular systems wherein signals generated by passengers control the stopping of the vehicle at a plurality of stations and has particular reference to the cancellation of false calls registered by passengers.

Although aspects of the invention are applicable to various vehicular systems such as those providing horizontal transportation, it is particularly suitable for vertical transportation systems and will be described as applied to an elevator system.

Description of the prior art

There are few things more irksome to a passenger in an elevator than making stops for false calls. Such stops also slow down service to prospective passengers and in general detract from the efficiency of the system. Sometimes such stops are accidental as where a passenger himself presses the wrong button or changes his mind. More often they are attributable to pranksters or someone trying to defeat the automatic supervisory system.

An example of the latter type of false call is the one registered by a passenger leaving a fully loaded car at the terminal floor so that the car will be dispatched to the floor at which his friends who could not get on are waiting. In order to circumvent the registration of this type of false call U.S. Pat. No. 2,740,495 prevents the registration of car calls at the ground floor for a substantial time after the car arrives, preferably until the car doors begin to close. U.S. Pat. No. 2,779,438 provides for similar incapacitation of the car call means while the car reverses at the lower terminal during down peak operation.

U.S. Pat. No. 2,776,733 also eliminates false calls registered by passengers departing the car at the terminal floor by cancelling all car calls if no one is present in the car as indicated by a load weighing switch in the floor of the car. This scheme also solves the problem created by the prankster who pushes all the buttons before leaving the car. U.S. Pat. No. 3,219,151 proposes that all car calls be cancelled if a predetermined number of calls are registered but the loading of the car does not exceed a predetermined minimum. Both of these last-mentioned patents depend upon load weighing devices which have limitations in reliability and accuracy.

None of the above proposed schemes satisfactorily combat the multiple registration of false calls. Multiple false calls are not always registered by the last passenger to leave the car. Often a passenger getting off of an ascending car at a lower floor will press all of the car call buttons to subject a remaining passenger going to a higher floor to a number of unnecessary intermediate stops.

Attempts to relate the total load in the car to the number of calls registered have been notably unsuccessful due mainly to the fact that the weight of passengers can vary from say 250 pounds or more for a large man to 50 pounds or less for a child. The problem is further complicated by the fact that all of the passengers may be going to the same floor or each one may be going to a different floor. Although the scheme of cancelling all car calls if no load is present in the car satisfactorily foils the prankster who registers calls upon leaving the car, such a scheme lacks flexibility and is costly because it requires a reliable and accurate load weighing device.

Since in any event it is virtually impossible to determine the subjective intent of each passenger who registers a car call, it is desirable to arrive at a scheme which is flexible enough to allow for an occasional misregistered call or change of mind yet is economically justifiable.

It is therefore the first object of the invention to provide an improved supervisory control system for an elevator.

It is a second object of the invention to provide a system as described in the first object including an improved method of cancelling false calls.

It is a third object of the invention to provide a system as described in the second object which is flexible enough to allow for an occasional misregistered call or a change of mind on the part of the passenger.

It is a fourth object of the invention to provide a system as described in the preceding objects which is both economical and reliable.

SUMMARY OF THE INVENTION

According to the invention, if a predetermined number of stops are made and no one passes through the entrance way of the car the remaining calls are cancelled. By providing for a plurality of false calls to be made before the remaining calls are cancelled, the system allows for error in pressing buttons and for a change of mind without cancelling other calls all of which may be valid.

Although the apparatus could be adapted to cancel either corridor calls or car calls or both, the preferred embodiment of the invention is concerned only with the cancellation of false car calls. A counter is provided which sums the number of stops made for false car calls. The counter is reset when a stop is made for a corridor call or for a car call during which a passenger passes through the entrance way of the car. The embodiment of the invention to be described in detail provides that if two successive stops are made for false car calls the remaining calls will be cancelled. The interruption of the car call circuits is for a duration only long enough to permit cancellation of the registered calls and calls can be reregistered almost immediately.

The decision as to whether a car call was a false call or not is delayed for a sufficient time after the car stops to permit passengers to leave the car. In the preferred embodiment of the invention the decision is delayed until the doors are almost closed.

Although any suitable method could be utilized to determine if a person passes through the entrance way of the car, the system described in detail utilizes the photoelectric detector commonly used in elevator systems today. Sophisticated detectors of this type or other types which differentiate between a passenger entering and a passenger leaving the car could be utilized but are not essential to this invention. Although the light beam utilized in the embodiment of the invention described does not differentiate between a passenger boarding or leaving the car, when the car stops for a car call only it is assumed that the person is getting off. This assumption can be made since if a person wanted to get on he most probably would have registered a corridor call.

Optionally the car calls remaining after stops have been made for two false calls can be cancelled only if they comprise a quota of calls. This limits the cancellation of car calls to situations in which there is an excessive number of calls registered but only requires that a small predetermined number of false calls be discovered before all of the calls are cancelled.

BRIEF DESCRIPTION OF THE DRAWING

The drawing illustrates in straight line form a portion of an elevator supervisory system embodying the invention.

DESCRIPTION OF THE PREFERRED EMBODIMENTS

In order to disclose a working embodiment of the invention, it will be described as applied to the elevator system disclosed in U.S. Pat. No. 3,292,736. In order to limit the complexity of this application, only those components of the elevator system therein disclosed directly affected by the subject invention will be described herein. For the purpose of completing the detailed description of the working embodiment of the invention U.S. Pat. No. 3,292,736 is hereby incorporated by reference into this application and will be hereinafter referred to as "the patent."

The elevator system described in the patent comprises six floors identified by the numerals 1 through 6. The car call circuits of the patent are reproduced in the lower portion of the figure. The car call registering circuits for all the intermediate floors are similar to each other. For this reason and to conserve space, intermediate floor call registering circuits are illustrated, as in the patent, for only the second and fifth floors.

The elevator car is provided with a plurality of pushbuttons $1c$ through $6c$ for the purpose of registering car calls for the first floor through sixth floor, respectively. The pushbuttons are normally open and are respectively associated with the car call registering relays 1CR through 6CR. Each of these relays has a cancelling coil associated therewith identified by the same reference character followed by the suffix N. For example, the car call registering relay 5CR for the fifth floor has a cancelling coil 5CRN wound on the same core and energized in opposition to the energization of the operating coil of the relay. Consequently, when the cancelling coil is energized, the relay is reset.

The pushbuttons and car call registering relays cooperate with three rows of contact segments located on the floor selector for the elevator car. Contact segments $f1$ through $f5$ cooperate with a brush $ff$ for the purpose of initiating a stopping operation of the elevator car during down travel of the car respectively at the first floor through fifth floor. Contact segments $g2$ through $g6$ cooperate with a brush $gg$ for the purpose of initiating a stopping operation of the elevator car A during up travel of the car respectively at the second floor through sixth floor. A brush $hh$ cooperates with a row of contact segments $h1$ through $h6$ for the purpose of cancelling registered car calls as they are answered during down travel and up travel of the elevator car. By reference to the drawing, it will be observed that when the car call pushbutton $5c$ is pressed, the car call registering relay 5CR is connected therethrough across the busses L1 and L2 as long as one of the make contacts C2–3, FC5 or QC1 are closed. Under normal operations all of these break contacts would be closed thereby providing energization for the relay 5CR. When energized this relay closes its make contacts 5CR1 to establish a holding circuit around the pushbutton. The contact segments $f5$ and $g5$ are connected through this set of contacts to the bus L1.

If the elevator car is set for down travel, make contacts X5 of the down preference relay X are closed; and if the elevator car is approaching the fifth floor, make contacts M7 of the running relay M also are closed. Consequently, as the floor selector carriage for the elevator car notches into its fifth floor position, the brush $ff$ engages the contact segment $f5$ to complete the following energizing circuit for the car call stopping relay T:

L1, 5CR1, $f5$, $ff$, X5, T, M7, L2

The energization of the relay T initiates a stopping operation of the elevator car at the fifth floor.

When the elevator car selector carriage is notched into its fifth floor position, the brush $hh$ also engages the contact segments $h5$. Thus, as the elevator car comes to a stop, break contacts M8 of the running relay close to complete the following energizing circuit for the cancelling coil 5CRN:

L1, 5CR1, 5CRN, $h5$, $hh$, M8, L2

Energization of the cancelling coil 5CRN resets the car call registering relay 5CR. The brushes $ff$ and $hh$ remain in engagement with their respective associated contact segments $f5$ and $h5$ as long as the elevator car remains at the fifth floor.

Next it will be assumed that the same call is registered for the fifth floor as the elevator car travels up towards the fifth floor. Under these circumstances, make contacts W6 of the up preference relay W are closed. As the floor selector carriage notches into its fifth floor position, the brush $gg$ engages the contact segment $g5$ to complete the following circuit:

L1, 5CR1, $g5$, $gg$, W6, T, M7, L2

The energization of the car call stopping relay T results in initiation of a stopping operation of the car at the fifth floor. In addition, brush $hh$ engages the contact segment $h5$ to effect the cancellation of the fifth floor car call in a manner which will be clear from the preceding discussion. The brushes $gg$ and $hh$ remain in engagement with the respective associated contact segments $g5$ and $h5$ as long as the elevator car is at the fifth floor.

The car call registering circuits for the upper terminal or sixth floor may be similar to those employed for the intermediate floors. However, since the elevator car stops at the sixth floor only during up travel, the contact segment for the sixth floor need not be provided in the $f$ row. By reference to the figure, it will be noted that only contact segments $g6$ and $h6$ are provided for the sixth floor. Contact segment $g6$, however, is connected directly to the bus L1, since the car always stops at the sixth floor if it reaches such floor.

The car call registering circuits for the lower terminal or the first floor may be similar to those provided for the intermediate floors. Since the elevator car stops at the first floor only during down travel, a contact segment for the first floor need not be provided in the $g$ row. For this reason, only contact segments $f1$ and $h1$ are illustrated for the first floor in the car call registering circuits. By reference to the drawing, it will be noted that the contact segment $f1$ is connected directly to the bus L1, since the car always stops at the first floor if it reaches such floor.

It will be observed that the car call registering circuit shown in the drawing is identical to that utilized in the patent except for the break contacts C2–3, FC5 and QC1 associated with the subject invention. As long as anyone of these contacts are closed the car call registering circuits will perform exactly as described above. If however, all of these contacts are open energization for the car call relays will be removed and the holding circuits will be dropped out. This will result in the cancellization of all registered car calls. Closure of any one of the above break contacts will reestablish the energizing circuit, however, the appropriate pushbutton will have to be depressed in order to reregister a call.

The circuits controlling the contacts C2–C3, FC5 and

C1 are shown in the drawing above the car call registering circuits. The detector memory coil Y can be energized either through the break contacts LB3 of the light beam relay or the make contacts S3 of the corridor call stopping relay S. The coil of the light beam relay LB is energized whenever a light beam projected from one side of the entranceway of the elevator car impinges upon the photoelectric cell located on the opposite side of the entranceway. Therefore as long as no load is passing through the entranceway of the car the break contacts LB3 in the drawing will be open. If an object passes through the entranceway of the elevator, however, the light beam relay will be deenergized resulting in the closing of the break contacts LB3 thereby energizing the detector memory relay Y. The contacts LB3 therefore serve as a detector for objects passing through the entranceway of the elevator.

The contacts S3 are closed whenever the corridor call stopping relay S is energized. The operation of this relay is fully described in the patent and it is sufficient to say that this relay is energized as a car approaches and stops at a floor at which a corridor call is registered. Therefore the relay Y will be energized when the car makes a stop for a corridor call whether the light beam is interrupted or not. Similar to the car call stopping relay T described above, the relay S is deenergized when the car stops at the floor.

Once energized the relay Y is held in through its holding contacts Y1 and break contacts M18 of the running relay. The running relay M as explained in the patent is energized any time the hoist motor of the elevator car is energized. Therefore the break contacts M18 are closed whenever the elevator car is stopped and while the car is stopping after energization to the hoist motor has been removed.

The false call relay FC will be energized whenever the car stops for a false car call. As discussed above, the determination that a stop has been made for a false call is derived from the fact that the car did not stop for a corridor call and the light beam across the entranceway of the car was not interrupted. Under these circumstances the break contact Y2 of the Y relay will be closed. Another prerequisite for energization of the relay FC is that there are registered calls to be cancelled. Therefore one of the sets of make contacts 1CR5 through 6CR5 must be closed indicating that another car call is still registered.

It is also evident that sufficient time must be allowed for a person to depart the elevator car and break the light beam before a volid determination can be made on whether the call was false or not. Although any method of permitting a sufficient time for passengers to depart the car could be provided within the spirit of the invention, the ideal time for checking for a false call is just before the doors complete their closing operation since at that time it is no longer possible for a passenger to depart the car. In order to permit energization of relay FC only during the final phase of door closure, the contacts 45–4, and 70T6 and the switch 27 have been placed in series with the coil FC. The operation of the coils 45 and 70T and of the switch 27 are fully explained in the patent. The relay 45 is the door-control relay which as can be seen from the patent is energized any time the doors are closed or closing and is deenergized during door opening or while the doors remain open. The switch 27 is cam operated to close whenever the doors are approximately four inches from their fully-closed position. Therefore the switch 27 is open when the doors are open more than four inches. The relay 70T is the non-interference relay which is energized while the car is running and remains energized for a predetermined length of time after the car stops. The delay is provided so that passengers have a sufficient time to enter or exit the car before the doors begin to close. When the non-interference time expires the relay 70T is deenergized and the doors will begin to close. It is evident therefore that a circuit can only be completed through these two sets of contacts and the switch when the doors are between four inches of being fully closed during the door closing operation. The switch SW is provided so that the automatic false call cancelling circuits can be removed from the system when desired.

In summary then, the relay FC will be energized if the automatic cancelling feature is selected (switch SW closed) when the car door reaches within four inches of being fully closed (switch 27 closed) during the door closing operation (contacts 45–4 and 70T–6 closed) if the car did not stop for a corridor call and the light beam was not interrupted (contacts Y2 closed) as long as any car call is registered (any of the contacts 1CR5 through 6CR5 closed).

The counter coils C1 and C2 are energized by the false call relay FC. The relay C1 is energized if a car call is registered (one of the sets of contacts 1CR5 through 6CR5 is closed) as long as the car has not stopped for a corridor call and the light beam has not been broken (break contacts Y2 closed) through the make contacts FC1 and the break contacts C2–1. Once energized the relay will be held in by the holding contact C1–1 as long as the relay C2 remains deenergized (break contacts C2–1 remain closed) or the relay FC is deenergized (break contacts FC4 closed). The relay C2 will be energized if a car call is registered (contacts 1CR5 through 6CR5 closed) and the car has not stopped for a corridor call and the light beam has not been broken (break contacts Y2 closed) when the relay FC is deenergized (break contacts FC2 closed) if the relay C1 is energized (make contacts C1–2 closed). Once energized the relay C2 will remain energized through its holding contacts C2–2 as long as the relay C1 remains energized (make contacts C1–2 remain closed) or if the relay FC is reenergized (make contacts FC3 closed). The circuits illustrated are for counting up to two false car calls. This is an arbitrary figure selected because it allows for one false call which could be a mistake or reflect a change of mind of the passenger without cancelling all of the calls registered. From the circuits disclosed one skilled in the art could construct similar circuits responsive to any desired number of false calls.

The quota relay QC is a current responsive relay which will only be activated when the current supplied to it exceeds a predetermined minimum value. The coil QC receives current through the variable resistor R70 which in turn receives current through a parallel circuit having branches associated with each car call registering means. Each branch of the parallel circuit is energized when a car call is registered for the associated branch. A current limiting resistor is connected in each branch of the parallel circuit to determine the amount of current which can flow in that branch. Resistors R71 through R76 are associated with the branches associated with the first through sixth floor respectively. For instance when the branch associated with a car call for the sixth floor is energized by the closing of contacts 6CR6, the resistor R76 determines the amount of current to be supplied to the coil QC through that branch of the parallel circuit. Each of the current limiting resistors is of similar value so that the total current flowing through the coil QC is proportional to the number of car calls registered. The variable resistor R70 can be adjusted so that the coil QC can be made responsive to any number of car calls. For purposes of illustration it will be assumed that the coil QC will be activated when two car calls are registered simultaneously.

It will be helpful at this point to describe some typical operations. Assume that the elevator car is standing at the first floor with the doors open and that no calls are registered in the system. Also assume that the automatic false call cancelling feature has been selected by the closure of the switch SW, but that the quota feature is not installed so that the contacts QC1 in the car call registering circuit are not present. Assume further that a passenger now enters the waiting car. His passage through the entranceway will result in interruption of the light beam thereby momentarily deenergizing the relay LB. This will result in the closing of the break contacts LB3 to complete a circuit for energization of relay Y. Since the car is at rest the contacts M18 of the running relay will be closed thereby completing a holding circuit for the relay Y through the holding contacts Y1. Energization of the relay Y results in opening of the break contacts Y2 in the counter circuit. This will have no effect on the system at this time since with no car calls registered all of the contacts 1CR5 through 6CR5 are open.

Assume now that the passenger registers car calls for the second, third, fourth and fifth floors by depressing the buttons 2C through 5C respectively. Since at this time the contacts C2-3 and FC5 are both closed, the depressing of the car call buttons will result in energization of the car call relays 2CR through 5CR which relays will remain energized through their respective holding contacts. Registering of these calls will result in closing of the contacts 2CR5 through 5CR5 in the counter circuit. As the doors begin to close the contacts 45-4 of the door control relay will close. At this time the break contacts 70T6 of the non-interference relay will be closed and when the doors reach within four inches of the fully closed position the switch 27 will close. The relay FC will not be energized at this time however, because the contacts Y2 remain open.

When the doors are fully closed the car will be started in the up direction to serve the registered car calls. The starting of the car will result in the opening of the break contacts 70T6 of the non-interference relay and in addition will result in the opening of the M18 break contacts of the running relay to interrupt the holding circuit for the relay Y. Since with the car running the light beam will not be interrupted the contacts LB3 of the light beam relay will be open so that the relay Y will remain deenergized. Even though the break contacts Y2 now close the relay FC can still not be energized since the contacts 70T6 are now open as just mentioned.

With the car set for up travel the contacts W6 of the up preference relay will be closed. As the floor selector for the elevator car notches into the second floor position the brush $gg$ will come in contact with the segment $g2$ to complete a circuit for energization of the car call stopping relay T through the holding contacts 2CR1 of the second floor car call relay and the contacts M7 of the running relay. Energization of the relay T initiates a stopping sequence which causes the elevator car to stop at the second floor. As the car comes level with the second floor the brush $hh$ on the carriage of the floor selector comes in contact with the segment $h2$. Since at this point the running relay M will be deenergized the break contacts M8 will be closed to complete a circuit for energization of the cancelling coil 2CRN. Energization of the cancelling coil 2CRN results in the deenergization of the second floor car call relay 2CR causing the holding contacts 2CR1 to open thereby cancelling the car call for the second floor.

Assume that the passenger leaves the car at the second floor. As he passes through the entranceway the light beam will be interrupted thereby deenergizing the light beam relay LB causing the break contacts LB3 to close. This again will result in energization of relay Y which will be held in through the holding contacts Y1 and the closed break contacts of the running relay M18 as previously explained. The break contacts Y2 in the counter circuit will therefore remain open during the door closing sequence preventing energization of the relay FC. Again the starting of the car will result in opening of the running relay contacts M18 thereby dropping out the relay Y to close the break contacts Y2 while at the same time opening the break contacts 70T6 of the non-interference relay.

The car is now traveling up for car calls at the third, fourth and fifth floors; however, there are no passengers in the car desiring service at these floors. As the floor selector notches into the third floor position the relay T will be energized in a manner similar to that described for the car approaching the second floor to initiate the stopping sequence. As the car comes to a stop the cancelling relay 3CRN will be energized to cancel the car call for the third floor. During this stop no one enters or leaves the car to energize the relay Y and therefore the contacts Y2 remain closed throughout the period of time that the car is at the third floor. At the time that the car is stopped the contacts 70T6 are open and as the doors begin to open the contacts 45-4 also open. Furthermore when the door is more than four inches from the closed position the switch 27 opens.

When the non-interference time has expired the contacts 70T6 will close. This will also initiate door closing so that the contacts 45-4 will close. When the doors of the car are within four inches of being fully closed the switch 27 will also close thereby completing a circuit for energization of the false call relay FC. Energization of this relay causes the contacts FC1 to close and since the relay C2 is deenergized at this time the relay C1 becomes energized through the break contacts C2-1. The holding contacts C1-1 thereupon close to form a holding circuit for the relay C1. Energization of the relay C1 also results in the closing of the contacts C1-2; however, the relay C2 remains deenergized at this time since the contacts FC2 are open as are the holding contacts C2-2.

When the doors are completely closed and the car begins to travel in the upward direction toward the fourth floor, the contacts 70T6 open to drop out the relay FC. This results in opening of the contacts FC1, however, the C1 relay remains energized through the contacts C1-1 and the break contacts FC4. At this point the contacts FC2 close to complete a circuit for the energization of the relay C2 through the closed contacts C1-2. The pick-up of this relay causes the holding contacts C2-2 to close. Energization of the relay C2 causes the break contacts C2-3 in the car call registering circuit to open, however, the car calls for the fourth and fifth floors will remain energized through the break contacts FC5.

As the floor selector notches into the fourth floor position the stopping relay T is energized in the manner similar to that described for the second and third floors. Again the stopping of the car at the fourth floor results in cancellation of the car call at the fourth floor. Assuming that this car call is also a false car call, no one enters or leaves the car so that the relay Y remains deenergized and therefore the contacts Y2 remains closed. It will be understood that the contacts Y2 remain closed even while the car is traveling from the third to the fourth floor since during this time the light beam is uninterrupted. Therefore as the car stops at the fourth floor the relays C1 and C2 are energized and the relay FC is deenergized. The circuit for the counter is completed through the contact 5CR5 of the car call relay for the fifth floor.

When the car doors reach the point four inches short of being fully closed and the switch 27 is closed the relay FC is energized. This results in the opening of the contacts FC4 and since the contacts C2-1 are also open the relay C1 is dropped out. Although at this time the contacts C1-2 and FC2 are open the C2 relay remains energized through the contacts C2-2 and the contacts FC3. At this point then the relays C2 and FC are energized simultaneously resulting in the opening of the contacts C2-3 and FC5 to interrupt the car call registering circuit. This results in the deenergization of the car call relay for the fifth floor, 5CR, causing the holding contacts 5CR1 to open. In addition the contacts 5CR5 in the counter circuit are opened to deenergize the counter. Under these conditions the relays FC and C2 will be deenergized thereby closing the contacts C2-3 and FC5. Since the relay C1 is also deenergized at this point the circuits are returned to their initial states. Since no calls are registered at this point the car will remain at the fourth floor and become available.

As an example of another aspect of the invention, assume that after the passenger enters at the first floor and registers car calls for the second, third, fourth and fifth floors that an up corridor call is registered at the fourth floor. If we assume that as before the passenger departs at the second floor a false car call will be registered for the third floor in the manner described above. Therefore as the car approaches the fourth floor relays C1 and C2 are energized while the relay FC is deenergized. When the car floor selector notches into the fourth floor position the corridor call for the fourth floor will be cancelled in a manner similar to that described above. However, since an up corridor call is also registered at the fourth floor, the contacts S3 of the corridor call stopping relay S will be closed as the car approaches the floor. This will provide a circuit for the energization of the relay Y. This in turn will open the contacts Y2 to drop out the relays C1 and C2. When the car comes to a halt the contacts M18 will close to hold the relay Y in through its holding contacts even though the contacts S3 then open. Therefore the contacts Y2 remain open when the doors close at the fourth floor and the counter remains reset. As a passenger enters the car at the fourth floor the contacts LB3 of the light beam relay will close; however, this will have no effect on the circuit since the relay Y is already energized.

Assume now that the person that boards the car at the fourth floor registers a car call for the sixth floor. When the car stops for the false car call at the fifth floor the relay FC will be energized upon door closing resulting in the energization of the relay C1. When the car starts up towards the sixth floor the relay FC will be deenergized and the relay C2 will be energized. Now even though the car has stopped for two false car calls, at the third floor and the fifth floor, the car call for the sixth floor is not cancelled because the counter circuit was reset by the corridor call at the fourth floor.

Returning to the original example where the passenger enters at the main floor and registers car calls for the second, third, fourth and fifth floors, assume that the quota feature is included in the circuits. It will be further assumed that the variable resistor R70 is so adjusted that the relay QC will be energized when two or more car calls are registered. As mentioned above this figure is purely arbitrary and the resistor R70 can be adjusted so that the relay QC will respond to any number of calls depending upon the configuration of the building and the traffic situation. Now when the passenger entering the car at the first floor registers car calls for the second, third and fourth floors thereby closing the contacts 2CR6, through 5CR6, the quota relay QC is energized. This results in opening of the contacts QC1 in the car call registering circuit, however, the circuit remains activated through the contacts C2–3 and FC5.

Assuming again that the passenger departs at the second floor, a false car call will be registered for the stop at the third floor. As before, when the doors close after the stop for the false car call at the fourth floor the relays FC and C2 are energized at the same time. This results in the opening of the contacts C2–3 and FC5. Without the quota feature this would interrupt the car call registering circuit to cancel the remaining car calls. However, under the circumstances herein described it will be remembered from the discussion above that the car call for the fourth floor was cancelled as the car notched into the fourth floor position. Therefore, the only call remaining registered is the car call for the fifth floor. With only the contacts 5CR6 in the quota circuit closed the current flowing through the resistor R75 is insufficient to maintain the relay QC in the energized state. Consequently, the contacts QC1 are closed and the car call for the fifth floor is not cancelled.

It should be noted that under the circumstances just described, the counting circuit will be reset when the car leaves the fourth floor. Since the relay C1 is deenergized at this point, the contacts C1–2 in the circuit of the C2 relay are open. Therefore, when the relay FC is deenergized with the opening of the 70T6 contacts as the car is started, the holding circuit for the C2 relay through the FC3 contacts is interrupted to drop out the C2 relay. With the relays FC, C1 and C2 all deenergized, the counting circuit is in its initial state.

If, on the other hand, the passenger entering the car at the first floor had registered car calls for all of the floors 2 through 6, then when the doors closed after making the second false stop for a car call at the fourth floor, car calls would remain registered at the fifth and sixth floors. Under these conditions the sum of the currents through the resistors R75 and R76 would be sufficient to maintain the relay QC in the energized state so that the contacts QC1 would remain open. Since the contacts C2–3, FC5 and QC1 in the car call registering circuit would all be open, the car calls at the fifth and sixth floors would be cancelled. Again the counting circuit is reset by the cancellation of all of the car calls. It should be noted that deactivation of car call circuits is only temporary and as soon as the calls have been cancelled the contacts C2–3, FC5 and QC1 will reclose to permit re-registration of car calls.

I claim as my invention:

1. A vehicular system comprising a structure having a plurality of landings, a vehicle mounted for movement relative to the structure to serve the landings, said vehicle having an entranceway through which load enters and exits, control means for controlling the movement of said vehicle between said landings, said control means including, call registering means operable for registering calls for landings at which service is desired, stopping means responsive to the call registering means for stopping the vehicle at landings for which a call is registered, detecting means operative from a first to a second condition when load passes through the entranceway and cancelling means responsive to the stopping means and the detecting means operative to cancel all calls registered by the call registering means when the vehicle makes a predetermined number of stops during which the detecting means remains in said first condition.

2. The vehicular system of claim 1 wherein the cancelling means includes counting means for counting the predetermined number of stops during which the detecting means remains in said first condition, said counter being reset each time the detecting means is operated to the second condition.

3. The system of claim 2 wherein said counting means includes delay means for delaying the response of the counting means to the first condition of the detecting means for a substantial time after the vehicle stops at a landing whereby adequate time is allowed for load to pass through the entranceway of the vehicle if it is so disposed.

4. The system of claim 3 including door means for closing and exposing said entranceway and wherein the delay means is responsive to the operation of said door means in such a manner that the counting means is only responsive to the first condition of the detecting means as the doors approach the substantially closed position during the closing operation.

5. The vehicular system of claim 4 wherein the call registering means includes vehicle call registering means for registering calls for landing desired by load within the vehicle and landing call registering means for registering calls from landings at which it is desired that the vehicle stop, wherein the cancelling means is only effective to cancel vehicle calls and wherein the counting means is reset each time the stopping means stops the vehicle in response to a landing call whereby said counter is only effective to count stops for false vehicle calls.

6. The vehicular system of claim 5 including quota means operative to render the cancelling means ineffective to cancel the vehicle calls unless the number of vehicle call registered exceeds a predetermined minimum number.

7. The vehicular system of claim 5 wherein the detecting means is only operated to the second condition in response to the detection of load exiting the vehicle whereby the counter will only be reset by the detecting means when load leaves the vehicle and whereby the counter will count all stops for vehicle calls during which no load leaves the vehicle.

References Cited

UNITED STATES PATENTS

| | | | |
|---|---|---|---|
| 2,779,438 | 1/1957 | Thurston | 187—29 |
| 3,219,151 | 11/1965 | Henker | 187—29 |

ORIS L. RADER, Primary Examiner

W. E. DUNCANSON, Jr., Assistant Examiner